126,948

UNITED STATES PATENT OFFICE.

JOHN FRECHETTE, OF CHICAGO, ILLINOIS.

IMPROVEMENT IN MEDICAL COMPOUNDS OR BITTERS.

Specification forming part of Letters Patent No. 126,948, dated May 21, 1872.

Specification describing a new and useful Improvement in Medical Compound, invented by JOHN FRECHETTE, of Chicago, in the county of Cook and State of Illinois.

My invention has for its object to furnish an improved medical compound or tonic-bitters for invigorating the system when reduced or weakened by sickness or other causes; and it consists in the compound prepared of the ingredients, in the proportions, and manner hereinafter set forth.

In preparing this compound, take one pound of orange-peel, three-quarters of a pound of calamus, one-quarter of a pound of ginger, one-quarter of a pound of bayberry-bark, and four lemons. These ingredients are ground and put into two gallons of pure spirits, diluted to not less than seventy-five per cent. of spirits.

The compound is then allowed to stand for thirty-six hours in a warm place, and is then reduced to forty per cent. of spirits, is sweetened to taste with crushed-sugar sirup, and is filtered. It is then ready for bottling for use or market.

Having thus described my invention, I claim as new and desire to secure by Letters Patent—

An improved medical compound, prepared of the ingredients, in the proportions, and manner substantially as herein described and set forth.

JOHN FRECHETTE.

Witnesses:
C. H. WILLIAMS,
L. HERBST.